Patented Apr. 15, 1941

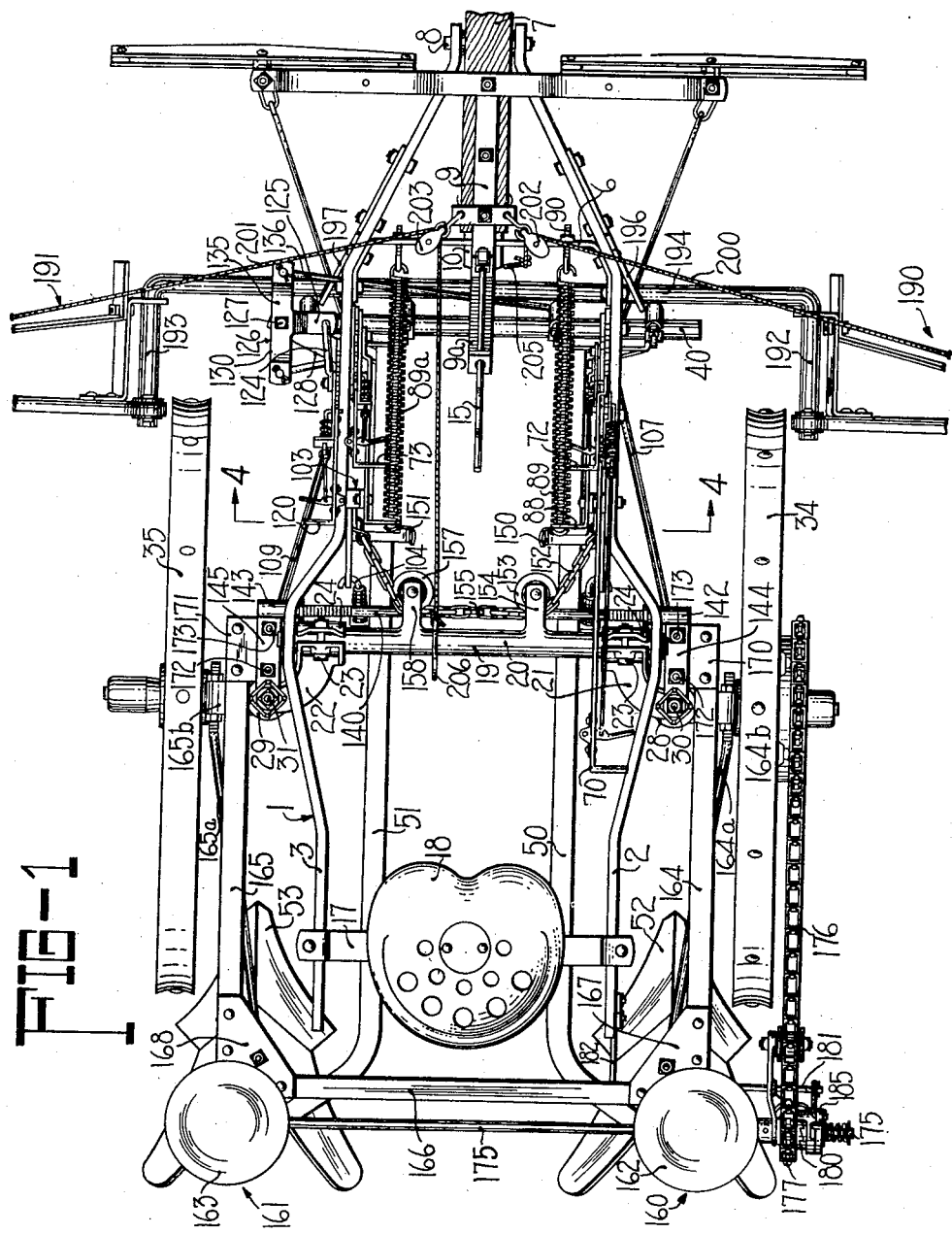

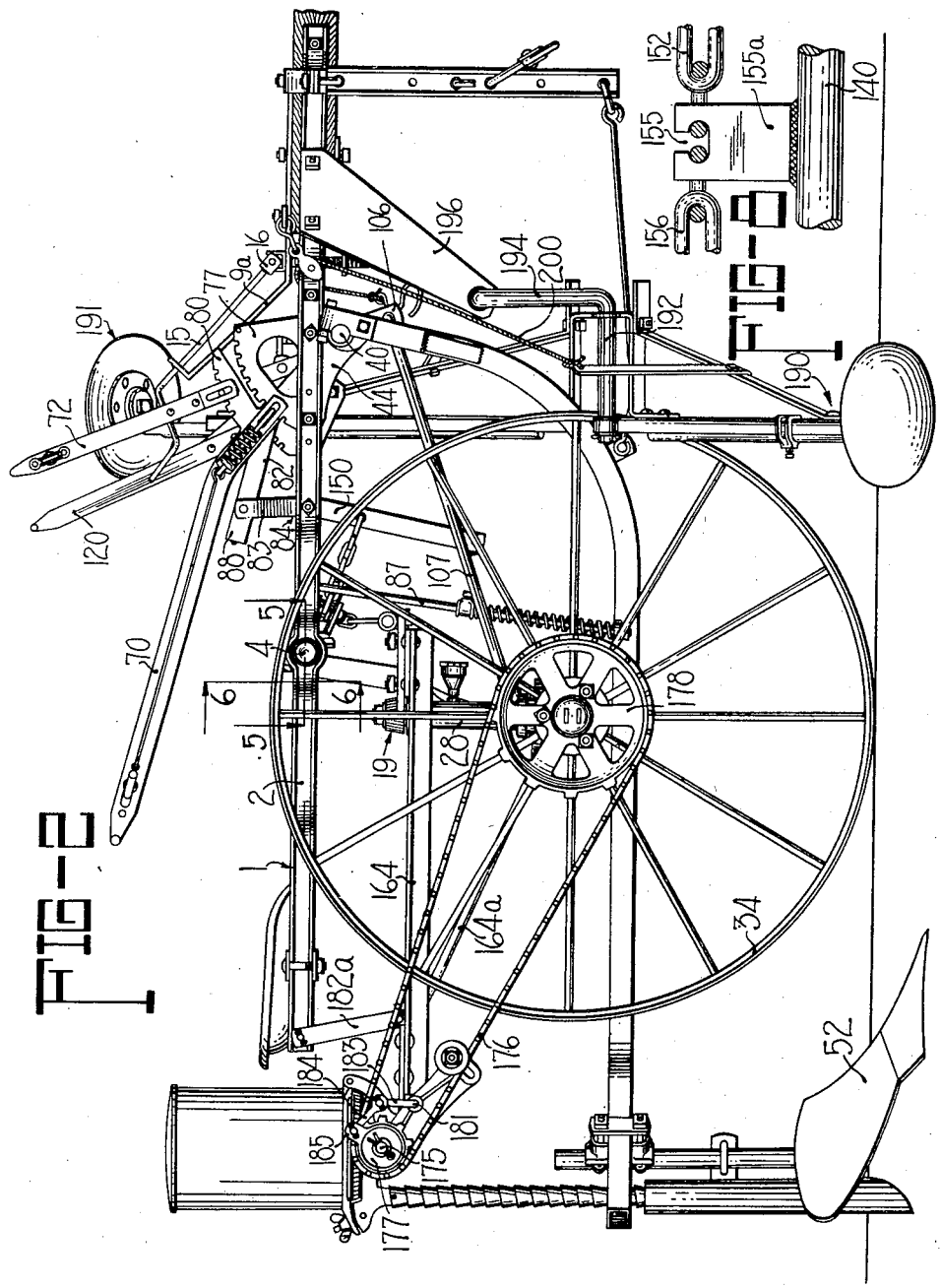

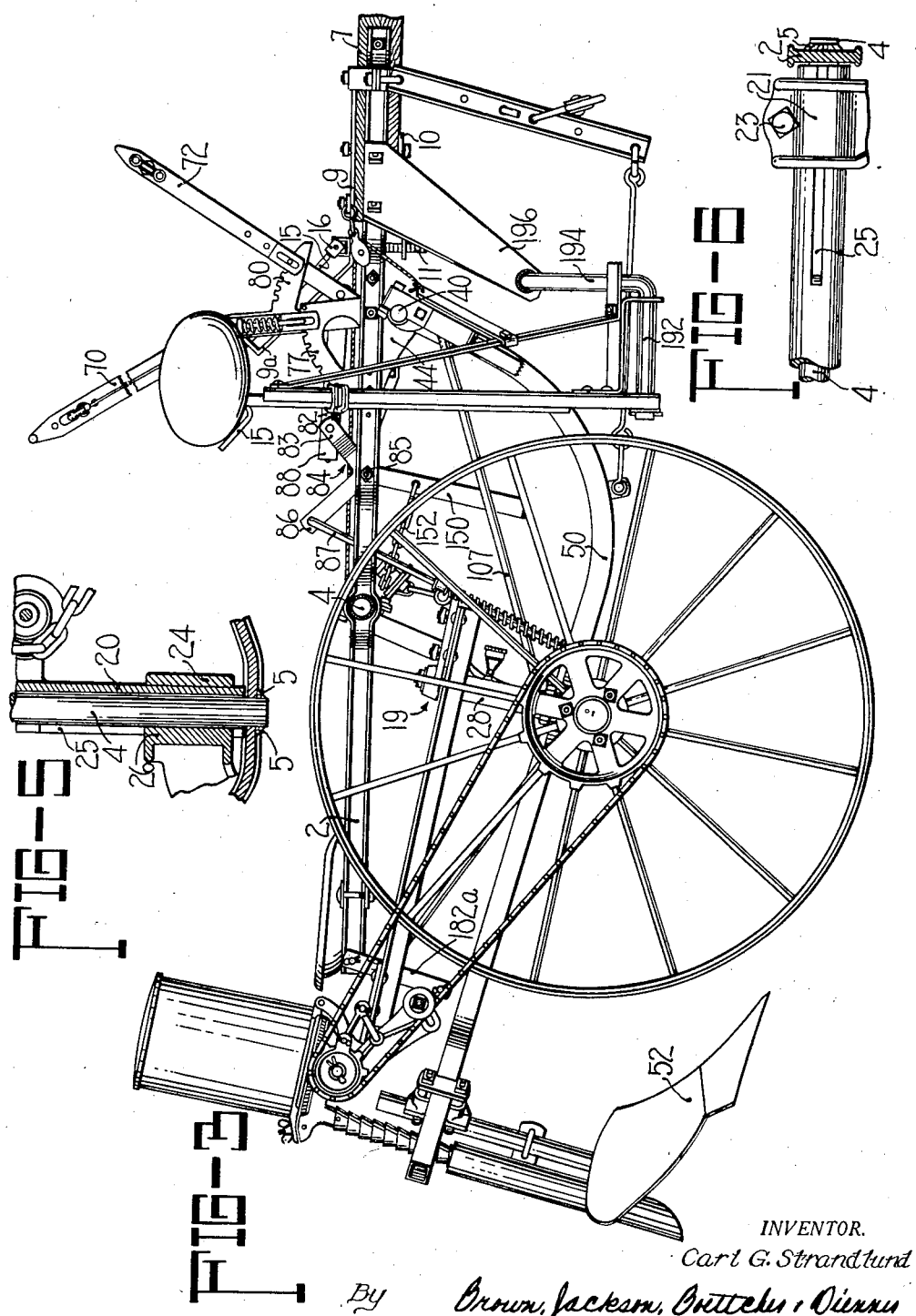

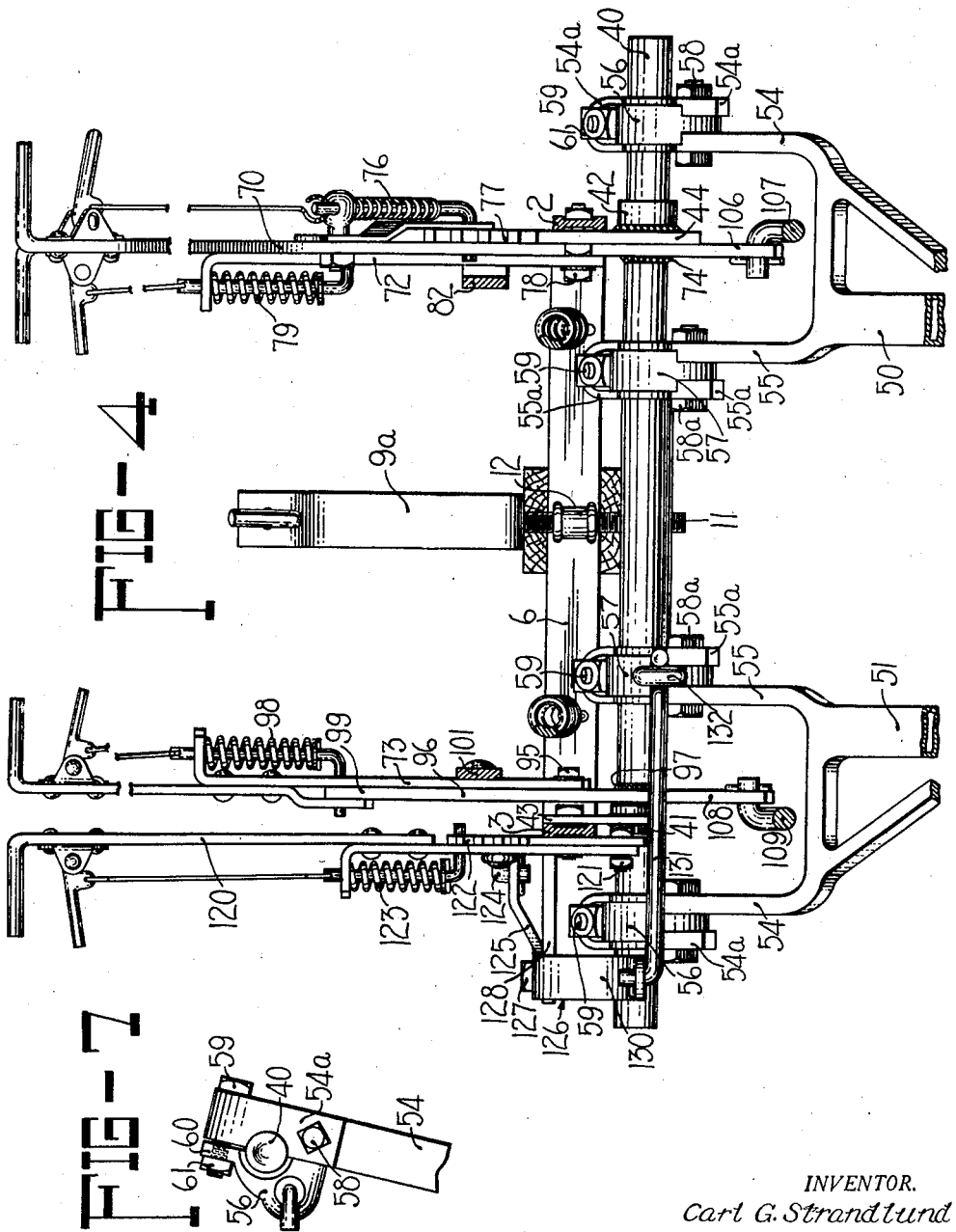

2,238,350

UNITED STATES PATENT OFFICE 2,238,350

CULTIVATOR

Carl G. Strandlund, Moline, Ill., assignor to Deere & Company, Moline, Ill., a corporation of Illinois Original application November 3, 1933, Serial No. 696,481, now Patent No. 2,097,678, dated November 2, 1937. Divided and this application May 3, 1937, Serial No. 140,333

12 Claims. (Cl. 97—148)

The present invention relates generally to agricultural implements and is specifically concerned with the provision of a cultivating implement adapted to receive a planting attachment so that the implement may be used for planting purposes as well as for cultivating purposes, as shown and described in my prior Patent No. 2,097,678, issued November 2, 1937, of which this a division. The principal object of the present invention is the provision of an improved steering control for the dirigible supporting wheels and an improved mechanism for adjusting the position of the tools and for raising and lowering them.

A further object of the present invention is the provision of an agricultural implement of the cultivator type in which the wheel arch has a transversely continuous rocking connection with the implement frame for fore and aft tilting movement. Another object of the present invention is the provision of new and improved means for adjusting the tread or wheel spacing of the supporting wheels and accommodating the steering mechanism to such adjustment.

Still further, another object of the present invention is the provision of new and improved means for raising and lowering the tool beams, particularly in connection with a swingable wheel frame. The present invention contemplates employing a single rock shaft which not only serves as the principal part of the raising and lowering means for the tool beams, but which also serves as a supporting frame bar to which the forward ends of the tool beams are connected and are supported, in addition, for lateral shifting movement.

These and other objects and advantages of the present invention will be apparent from the following detailed description of the preferred structural embodiment, taken in conjunction with the accompanying drawings illustrating such embodiment.

In the drawings:

Figure 1 is a top plan view of an agricultural implement embodying the principles of the present invention;

Figure 2 is a side elevation of the machine shown in Fig. 1 arranged with the tools in ground engaging or operative position;

Figure 3 is a side view of the machine with the tools raised out of ground-engaging position and in inoperative position;

Figure 4 is an enlarged fragmentary section taken approximately along the line 4—4 of Figure 1;

Figure 5 is a fragmentary section taken along the line 5—5 of Figure 2;

Figure 6 is an enlarged section taken along the line 6—6 of Figure 2;

Figure 7 is an enlarged fragmentary side elevation, illustrating the connection between the forward ends of the tool beams and the rock shaft to which they are connected; and Figure 8 is a fragmentary view illustrating the connection between the steering means and the adjustable drag link means connected with the steering arms of the dirigible supporting wheels.

Referring now to the drawings, the main frame 1 of the cultivator comprises a pair of generally longitudinally extending frame members 2 and 3 which are fixedly connected together by means of a centrally disposed transverse shaft or bar 4 (Figure 2) which extends through perforations in the frame members 2 and 3 and is welded at its laterally outer ends to the frame members, as indicated at 5 in Figures 5 and 6. Near their forward ends the frame bars or members 2 and 3 are also connected together by means of a cross brace or transverse frame member 6. The ends of the frame bars 2 and 3 converge forwardly and are disposed on opposite sides of a pole or tongue 7 which is pivoted by means of a bolt 8 to the forward converged ends of the frame bars, as best shown in Figure 1.

The rear end of the pole 7 carries an upper plate 9 on its top face and a lower plate 10 on its bottom face, and these plates extend rearwardly on opposite sides of the cross brace 6. A screw 11 is journaled in aligned perforations in the upper and lower plates 9 and 10 and is threaded into a nut 12 supported, as best shown in Figure 4, by the frame member 6. The rear end of the upper plate 9 extends upwardly and rearwardly, as at 9a, and supports a crank screw 15 connected by means of a universal joint 16 with the screw 11. By rotating the crank 15 the screw 11 may be turned to shift the position of the rear end of the tongue 7 relative to the cross brace 6 and, hence, relative to the main frame 1 of the implement.

The rear ends of the frame members 2 and 3 are connected by a cross bar 17 which also carries a seat 18. The cross bar 17 may be adjusted fore and aft on the frame bars 2 and 3.

The main frame 1 of the cultivator is supported upon a wheel frame indicated in its entirety by the reference numeral 19 and consisting of parts serving as a wheel arch, the intermediate portion of which is pivoted to the main frame 1 and is provided with depending portions to which the supporting wheels are connected. The wheel frame or arch 19 consists of a pipe 20 journaled on the transverse shaft 4 which is fixed, as by welding, to the frame members 2 and 3, as described above. A pair of castings 21 and 22 are adjustably fixed to the opposite ends of the pipe 20 by means of bolts 23 and caps 24. The castings 21 and 22 are capable of adjustment laterally along the pipe 20, and to this end slots 25 are cut into the pipe adjacent the ends thereof, and into these slots are fitted keys 26 which are formed integral with the castings 21 and 22, as best shown in Figures 5 and 6. A particular advantage of this construction is that the full length of bearing of pipe 20 upon shaft 4 is had, regardless of the position of castings 21 and 22 upon pipe 20. By loosening the bolts 23 the castings 21 and 22 may be adjusted inwardly or outwardly on the pipe 20 to vary the spacing of the supporting wheels.

The castings 21 and 22 are provided, respectively, with sleeves 28 and 29 formed integral therewith and in which are journaled vertical spindles 30 and 31. These spindles are formed integral with the axles on which the supporting wheels 34 and 35 are journaled. The castings 21 and 22, together with the wheel spindles carried thereby and the pipe 20 upon which the castings are adjustably mounted, constitute the wheel frame unit or wheel arch which is pivotally connected with the main frame 1 about a transverse axis, whereby the wheel frame unit is capable of swinging fore and aft relative to the frame 1.

Near the forward end of the main frame 1 is a transverse rock shaft 40 which is journaled in bearings 41 and 42 and carried by brackets 43 and 44, respectively, depending from and secured to the frame bars 2 and 3. A pair of tool beams 50 and 51 are journaled at their forward ends upon the rock shaft 40, and tools 52 and 53 are fixed to the rear ends of the beams 50 and 51. When used as a cultivator without a planting or seeding attachment, the beams 50 and 51 support cultivator shovels or other tools, and when used as a planter the tools 52 and 53 may be furrow openers.

Each of the tool beams 50 and 51 is forked at its forward end, laterally spaced arms 54 and 55 being thus provided, and these arms are journaled on and supported by the rock shaft 40. To this end, castings 56 and 57 are provided for each tool beam, and the end of each of the outer arms 54 is looped back upon itself, as best shown at 54a in Figures 4 and 7, and is thus adapted to embrace the casting 56, the latter being disposed between the arm 54 and the looped end 54a. The arm 54 is connected to the casting 56 by means of a bolt 58 which passes through the arm sections 54 and 54a. The arms 55 are mounted on the casting 57 carried by the shaft 40, the arms 55 having looped sections 55a embracing the castings 57 and secured thereto by bolts 58a.

As best shown in Figure 7, the castings 56 have semicircular depressions cooperating with similar semicircular depressions formed in the looped end of the arm 54 to receive the shaft 40. The construction of the arms 55 and the castings 57 is similar. The size of the openings thus provided for the shaft 40 may be adjusted by means of a bolt 59 which is disposed in the bight of the looped end of the associated arms and is threaded into a perforation formed in the associated casting, as indicated at 60. Each of the bolts 59 is locked in adjusted position by means of a lock nut 61. By virtue of this construction the forward ends of the beams 50 and 51 are mounted on the rock shaft 40 for both pivotal and lateral sliding movement.

Raising and lowering of the tool beams 50 and 51 is accomplished by pivoting the beams about the transverse pivot axis defined by the rock shaft 40. Such raising and lowering movements of the beams 50 and 51 are controlled by means of a master lever 70 and individual levers 72 and 73. The lever 70 is fixedly secured, as by welding, to the shaft 40, as shown at 74 in Figure 4, and a latch mechanism 76 is carried by the lever 70 and cooperates with a notched sector 77 which extends upwardly from and is preferably formed integral with the bracket 44, the latter being securely bolted to the frame bar 2.

The lever 72 is pivotally connected with the lever 70 by means of a pivot bolt 78 and carries a latch mechanism 79 which cooperates with a notched sector 80 fixed to the lever 70, as best shown in Figure 3. A link 82 is pivotally connected at one end with the lever 72 and at the other end with one arm 83 of a bell crank 84 which is pivotally mounted on the frame member 2, as at 85. The other arm 86 of the bell crank 84 is connected to a lifting rod 87, and the latter is connected with the beam 50. The link 82 is provided with a rearward extension 88, the rear end of which is bent at right angles and has connected thereto a counterbalancing spring 89, and the forward end of the latter is adjustably connected to the transverse brace 6 by means of a bolt 90, as best shown in Figure 1. Thus, with the master lever 70 latched to its sector 77, rocking of the lever 72 will rock the bell crank 84 and, in turn, raise or lower the tool beam 50.

For raising or lowering the other tool beam 51, similar mechanism is provided. Referring to Figure 4, the opposite lever 73 is pivotally connected at 95 to an arm 96 welded or otherwise securely fixed to the rock shaft 40, as indicated at 97. The lever 73 carries latch mechanism 98 which cooperates with a notched sector 99, preferably formed integral with the arm 96. The lever 73 is connected by means of a link 101 with one arm of a bell crank 103 (Fig. 1) which is pivotally mounted on the frame bar 3, and the other arm of the bell crank 103 is connected by means of a lifting rod 104 with the left-hand tool beam 51. A counterbalancing spring 89a is connected with a rearward extension of the link 101 and with the frame bar 6, similar to the counterbalancing spring 89 described above. With the master lever fixed in position, rocking the adjusting lever 73 will raise and lower the tool beam 51.

Rocking the master lever 70 causes a rocking movement of the shaft 40, and since the adjusting lever 72 is latched to a sector which is carried by the lever 70 and the adjusting lever 73 is latched to a sector 99 which is fixed to the rock shaft 40, the rocking of the latter will raise both of the tool beams 50 and 51.

Reference is made above to the feature of having the wheel frame unit pivot with respect to the main frame when the tool beams are raised and lowered. Specifically, the wheel frame is pivoted in such a manner that the supporting wheels move rearwardly when the tool beams are raised, this being for the purpose of accommodating the increased load when the tools are raised out of the ground and to maintain the implement in balance. The means providing this construction in the present implement will now be described.

The lever 70, which is fixed to the rock shaft 40, extends below the latter and forms an arm 106 which, as best shown in Figure 4, is disposed between the arms 54 and 55 of the tool beam 50. The arm 106 is connected by means of a link 107 with the sleeve 28 on the casting 21. On the other side of the implement, the arm 96 is provided with a similar depending portion forming an arm 108 disposed between the arms 54 and 55 of the left-hand tool beam 51. The arm 108 is connected by means of a link 109 with the sleeve 29 on the casting 22.

By reason of the above described connections with the spindle sleeves 28 and 29, whenever the lever 70 is rocked to lift both of the tool beams 50 and 51, the pipe 20 and the castings 21 and 22 which are fixed thereto, together with the sleeves 28 and 29 formed integral with the castings 21 and 22, are all rocked rearwardly to compensate for the added weight disposed at the rear of the cultivator, due to the lifting of the furrow openers or other tools to maintain the cultivator in balance.

Mention is made above to the fact that not only are the forward ends of the tool beams 50 and 51 pivotally supported on the rock shaft 40, but that the tool beams are capable of lateral movement thereon for the purpose of varying the transverse spacing of the beams. The means for adjusting the beams 50 and 51 laterally will now be described.

A lever 120 is pivotally connected, as at 121 in Figure 4, to the lower portion of a notched sector 122 mounted on the frame member 3. The lever 121 carries a latch mechanism 123 which cooperates with the notches of the sector 122 in holding the lever 120 in adjusted position. The lever 120 is connected by means of a link 124 with an arm 125 formed on a T-lever 126 pivotally connected by means of a bolt 127 to the outer end of a bracket 128 carried by the frame member 3 and projecting laterally outwardly therefrom, as best shown in Figure 4. A downwardly inclined arm 130 is formed on the T-lever 126 and is connected by means of a link 131 to a perforated lug 132 formed integrally on and extending rearwardly from the casting 57 of the tool beam 51. An opposite arm 135 (Figure 1), also downwardly inclined, is connected by means of a link 136 to a perforated lug formed integral with and extending forwardly of the casting 57 for the other tool beam 50. Rocking the adjusting lever 120 will swing the T-lever 126, thereby causing the beams 50 and 51 to recede or approach each other.

The supporting wheels 34 and 35 of the implement are dirigible wheels and are connected together by means of a drag link 140. The ends of the drag link 140 are threaded, one being a right-hand thread and the other a left-hand thread, and are screwed, respectively, into sockets 142 and 143 pivotally carried at the outer ends of steering arms 144 and 145 which are fixedly secured, respectively, to the upper ends of the spindles 30 and 31.

The steering means for shifting the drag link 140 to steer the wheels 34 and 35 consists of a pair of foot pedals 150 and 151. The right-hand pedal 150 is journaled on the bolt 85 on which the bell crank 84 is pivoted, as best shown in Fig. 3, and the left pedal 151 is similarly supported. A chain 152 is connected at its forward end to the pedal 150 and is trained around a roller 153 supported between a pair of vertically spaced arms 154 extending forwardly from and preferably formed integral with the pipe member 20. The other end of the chain 152 is hooked into a T-shaped slot 155 (see Figure 8) formed in the upper end of a lug 155a which extends upwardly from and is securely fixed to the drag link 140, as by welding or the like. A chain 156 is provided for the left foot pedal 151 and is connected therewith at its forward end and with the lug 155a at its other end. The chain 156 passes around a roller 157 journaled between arms 158 extending forwardly from and formed integral with the pipe 20. Operating the foot pedals 150 and 151 in opposite directions steers the wheels 34 and 35.

When the wheels 34 and 35 are adjusted inwardly and outwardly by sliding the castings 21 and 22 inwardly or outwardly on the pipe 20, the corresponding adjustment of the drag link 140 is also made by unhooking the inner ends of the chains 152 and 156 from the lug 155a and then using the lug to rotate the drag link 140 to screw it into or out of the sockets 142 and 143, after which the inner ends of the chains 152 and 156 are again hooked to the lug 155a. When the chains 152 and 156 are hooked to the lug they effectively prevent any accidental rotation of the drag link 150. By virtue of this construction not only can the drag link 140 be used to adjust the steering mechanism for any lateral adjustment of the wheels 34 and 35, but also this means can be used for adjusting the gather or camber of the dirigible wheels.

The structure, so far as described above, is in the nature of a cultivator for cultivating row crops and the like and, to this end, the tool beams 50 and 51 may be provided with any form of cultivating means, such as shovels, discs and the like, and by virtue of the construction wherein the rock shaft 40 not only serves to raise and lower the tool beams but also serves as a support for the forward end of the tool beams, the vision had by the operator of the row being cultivated is greatly improved over such prior art constructions wherein a second rock shaft was provided for the raising and lowering means, in addition to a cross beam or bar upon which the cultivator beams were mounted.

As pointed out in the above-mentioned parent application, the implement described above is adapted to receive a planting or seeding attachment which comprises a pair of seed selecting mechanisms 160 and 161 provided with seed cans 162 and 163, respectively. The seed selecting mechanisms are mounted on a planter frame consisting of a pair of longitudinally extending frame bars 164 and 165 connected together at their rear ends by a cross member 166, gusset plates 167 and 168 forming the connecting means between the longitudinal bars 164 and 165 and the transverse bar 166 and serving to rigidly connect these parts together. At the forward ends of the longitudinal members 164 and 165, plates 170 and 171 are riveted or otherwise securely fixed thereto, and these plates are, in turn, bolted by means of bolts 172 and 173 to the steering arms 144 and 145 carried by the steering wheel spindles 30 and 31, thus holding the wheels 34 and 35 in their straight ahead position and rendering the steering means ineffective so long as the planting attachment is in position. The frame of the planting attachment is further supported by means of a pair of downwardly and forwardly extending rods 164a and 165a which are connected at their rear ends to the gusset plates 167 and 168 and at their forward ends are disposed in perforated lugs 164b and 165b formed integral with the wheel frame sleeves 28 and 29, as best shown in Figure 1. The ends of the brace rods 164a and 165a connected with the perforated lugs are threaded to receive adjusting nuts disposed on opposite sides of the lugs associated therewith.

The seed selecting mechanisms 160 and 161 are driven by a common drive shaft 175 which is journaled on the planter frame and arranged transversely with respect to the implement. The drive shaft 175 is, in turn, driven by means of a chain 176 trained over a driven sprocket 177 fixed to the shaft 175 and over a driving sprocket 178 bolted or otherwise secured to the driving wheel 34. Suitable clutch mechanism is interposed between the shaft 175 and the sprocket 177 for interrupting the drive from the wheel 34 to the seed selecting mechanisms 160 and 161. Such clutch mechanism, indicated in its entirety by the reference numeral 180, comprises separable members of more or less conventional construction, which are controlled by means of a rock shaft 181 supported from the planting attachment frame. The rock shaft 181 is provided with an arm 182 formed on or carried by the inner end thereof, and the arm 182 is connected by means of a link 182a with the rear end of the frame bar 2, as best shown in Figure 2. The laterally outer end of the rock shaft 181 has an arm 183 formed thereon which is connected by means of a link 184 to a control member 185 forming a part of the clutch 180.

A pair of markers 190 and 191 are mounted on the implement, preferably on the main frame thereof. These markers are pivotally carried on the rearwardly and longitudinally bent portions 192 and 193 of a transversely disposed member 194 which is, in turn, supported and rigidly fixed to a pair of brackets 196 and 197 bolted to the sides of the frame members 2 and 3 adjacent the forward ends thereof. The markers are raised and lowered by means of cables 200 and 201 which pass over pulleys 202 and 203. At their inner ends these cables are provided with hooks 205 and 206, either of which may be engaged over the pipe 20 to hold either or both of the associated markers in raised position. As shown in Figure 1, the left-hand marker 191 is in raised position while the right-hand marker 190 is in lowered position.

While I have described above the preferred construction in which the principles of the present invention have been embodied, it will be apparent that my invention is not to be limited to the specific details shown and described but that, in fact, widely different means may be employed in the practice of the broader aspects of my invention.

What I claim, therefore, and desire to secure by Letters Patent is:

1. An agricultural implement having a main frame comprising a pair of spaced longitudinally extending frame members and a transverse shaft fixedly connected at its ends to said frame members, a wheel frame comprising a tube journaled over said shaft, a pair of wheel supports adjustably secured to said tube for lateral adjustment, tool beams pivoted to said main frame for vertical movement, and means for raising said beams and for simultaneously rocking said wheel frame rearwardly relative to said main frame.

2. An agricultural implement comprising a main frame, a wheel arch pivotally connected to said frame for swinging movement relative thereto about an axis, a transversely disposed rock shaft journaled on said frame near the forward end thereof, a pair of spaced rearwardly extending tool beams journaled on said rock shaft at their forward ends, a bell crank pivoted on each side of the frame rearwardly of said rock shaft and forwardly of said wheel arch axis, each bell crank being link-connected to the adjacent beam, lever means connected with said rock shaft for rocking the same, a pair of sectors fixed to said rock shaft, and a lever pivoted to each sector and link-connected to the bell crank associated therewith.

3. An agricultural implement comprising a main frame, a wheel arch pivotally connected to said frame for swinging movement about a transverse axis, a transversely disposed rock shaft journaled on said frame forwardly of said wheel arch axis, a pair of laterally spaced rearwardly extending tool beams mounted on said rock shaft at their forward ends for rotatable and lateral shifting movement, lifting connections for each beam mounted on said frame between said rock shaft and said wheel arch axis, connections between said lifting connections and said rock shaft, whereby rocking of said rock shaft serves to lift both beams simultaneously, a bracket carried by said frame adjacent one end of said rock shaft, a lever mounted for generally horizontal swinging movement on said bracket and operatively connected with said tool beams for shifting them laterally along said rock shaft, and means connected to said frame between said rock shaft and said wheel arch axis for rocking said lever.

4. An agricultural implement comprising a wheel supported main frame, a transversely disposed rock shaft journaled on said frame near the forward end thereof, a pair of laterally spaced rearwardly extending tool beams mounted on said rock shaft at their forward ends for rotatable and lateral shifting movement, lifting connections for each beam mounted on said frame, connections between said lifting connections and said rock shaft, whereby rocking of said rock shaft serves to lift both means simultaneously, a bell crank pivoted to said frame near one side thereof, said bell crank having a pair of oppositely disposed arms, links connecting said arms, respectively, with the forward ends of said tool beams, and means for rocking said bell crank to shift the forward ends of said tool beams laterally on said rock shaft.

5. An agricultural implement having a main frame comprising a pair of spaced longitudinally extending frame members and a transverse shaft fixedly connected at its ends to said frame members, a wheel frame including a sleeve mounted for rocking movement on said shaft, a pair of wheel supports having sliding non-rotating movement on said sleeve, tool beams pivoted to said main frame for vertical movement, and means for raising said beams and for simultaneously rocking said wheel frame rearwardly relative to said main frame.

6. An agricultural implement comprising a wheel supported frame having two laterally spaced generally longitudinally disposed frame bars, a transversely disposed rock shaft journaled on said frame bars near the forward end of said frame, a pair of laterally spaced rearwardly extending tool beams mounted on said rock shaft for rotatable and lateral shifting movement relative thereto, lifting means for each beam comprising a bell crank lever pivoted to the associated frame bar at the inner side thereof and means serving as arms connected to said rock shaft and link-connected to said bell cranks, said arm means being disposed adjacent said frame bars, connections between said bell cranks and said beams whereby rocking of the rock shaft serves to lift both beams simultaneously, a bell crank pivotally supported on one of said frame bars at a point laterally outwardly thereof, said bell crank having a pair of oppositely disposed arms, links connecting said arms, respectively, with the forward ends of said tool beams, an adjusting lever mounted on said one frame bar also laterally outwardly thereof for rocking said bell crank to shift the forward ends of said tool beams laterally on said rock shaft, and an operator's seat supported on the rear laterally spaced upper ends of said frame bars.

7. An agricultural implement comprising, in combination, a main frame including a pair of laterally spaced generally longitudinally extending main frame members, each of said members having a laterally outwardly bent section, a cross bar connected at its lateral ends to said sections, a tubular sleeve mounted for rocking movement on said cross bar between said longitudinal main frame bars, said sleeve having slots therein at the ends thereof, wheel supporting brackets adjustably fixed to said sleeve adjacent the ends thereof and each of said brackets having a portion disposed in the associated slot, whereby rotation of the brackets on the sleeve is prevented.

8. A cultivator comprising, in combination, a pair of generally longitudinally disposed frame bars, a cross bar fixed at its ends to said frame bars between the ends of the latter, a draft bar carried adjacent the forward ends of said longitudinal frame bars, a pair of wheel supporting brackets connected with said cross bar, each of said brackets including a generally vertically disposed spindle-receiving section and a laterally inwardly and upwardly disposed arm fastened to said cross bar at points in between said longitudinal frame bars, vertically swingable tool beams pivotally connected to said shaft bar and extending rearwardly in vertical planes lying between the vertical spindle-receiving sections of said wheel brackets, and an operator's seat carried on the rear ends of said longitudinal frame bars.

9. An agricultural implement comprising, in combination, a main frame including a pair of generally longitudinally extending frame bars and a cross bar fastened to said longitudinal bars at its ends, wheel supporting brackets connected to the ends of said cross bar and each including a rearwardly and laterally outwardly directed wheel-receiving section, a wheel spindle journaled in each of said sections for movement about a substantially vertical axis, supporting wheels mounted on said spindles, each of the latter including a forwardly disposed arm, a drag link extending transversely of the main frame and pivoted at its ends to the forward ends of said arms, said drag link being disposed adjacent said cross bar, and means supported for lateral shifting movement on the cross bar and operatively connected with said drag link for steering said wheels.

10. An agricultural implement comprising, in combination, a main frame having a cross bar secured at its ends against rotation relative to the main frame, a tubular member mounted for rocking movement on said cross bar and having a pair of laterally spaced forwardly extending lugs, wheel supporting brackets fastened to opposite ends of said tubular member, dirigible wheels carried by said brackets and each including a steering arm, a transverse drag link connecting such steering arms, and steering mechanism for said dirigible wheels comprising a pair of pedals pivoted to said main frame, pulleys supported by the lugs of said tubular member, and a flexible element trained over said pulleys and connected at its intermediate portion to said drag link and at its ends to said pedals.

11. An agricultural implement comprising, in combination, a main frame including a cross bar, a tubular member mounted for rocking movement on said cross bar and having a pair of laterally spaced forwardly extending lugs, pulleys on said lugs, a wheel-supporting bracket adjustably connected to each end of said tubular member, a wheel spindle mounted for steering movement in each of said brackets, a supporting wheel journaled at each spindle, a steering arm projecting forwardly from each of said spindles, a transverse drag link having right-hand and left-hand threaded connection, respectively, with said steering arms, a pair of steering pedals movably carried by said frame, a flexible element connected at its outer ends to said pedals, the intermediate portion of said flexible element being trained over said pulleys and releasably connected to the intermediate portion of said transverse drag link.

12. An agricultural implement comprising a main frame having a cross bar, a tubular member mounted for rocking movement on said cross bar, a pair of wheel supporting brackets fastened to opposite ends of said tubular member and rockable relative to the frame therewith, wheels mounted on said brackets, a draft bar carried at the forward end of said frame, a pair of tool beams extending generally longitudinally of the frame and each having a pair of laterally spaced arms at its forward end connected with the draft bar for generally vertical pivotal movement and capable of lateral adjustment along the draft bar laterally of the frame, means for rocking said draft bar, connections associated therewith for raising and lowering the tool beams when said draft bar is rocked, an arm fixed to said draft bar at each side of the frame and extending into the space between the pair of tool beam arms, the spacing between the latter accommodating lateral adjustment of the tool beams along the draft bar, and a connection between each of said last named arms and said wheel supporting brackets providing for tilting of the latter when said draft bar is rocked to raise the tool beams.

CARL G. STRANDLUND.